United States Patent [19]

Lyding

[11] Patent Number: 4,841,148

[45] Date of Patent: Jun. 20, 1989

[54] VARIABLE TEMPERATURE SCANNING TUNNELING MICROSCOPE

[75] Inventor: Joseph W. Lyding, Champaign, Ill.

[73] Assignee: The Board of Trustees of The University of Illinois, Urbana, Ill.

[21] Appl. No.: 170,732

[22] Filed: Mar. 21, 1988

[51] Int. Cl.$^4$ ............................................. G01N 23/00
[52] U.S. Cl. ..................................... 250/306; 250/307; 250/310; 250/311; 250/423 F
[58] Field of Search ............ 250/306, 309, 310, 423 F, 250/442.1

[56] References Cited

U.S. PATENT DOCUMENTS

| | | | |
|---|---|---|---|
| 4,343,993 | 8/1982 | Binnig et al. | 250/423 F |
| 4,665,313 | 5/1987 | Wells | 250/423 F |
| 4,668,865 | 5/1987 | Gimzewski et al. | 250/306 |

Primary Examiner—Bruce C. Anderson
Assistant Examiner—Michael Aronoff
Attorney, Agent, or Firm—Marshall, O'Toole, Gerstein, Murray & Bicknell

[57] ABSTRACT

A thermally compensated tube scanner scanning tunneling microscope utilizes two concentric piezoelectric tubes, one for scanning and one for coarse translation as well as fine adjustment of sample position while in tunneling range. There are no mechanical components such as springs, levers, gears, or stepper motors which are known to result in considerable vibration sensitivity and thermal drift. Consequently, the standard mode of atomic resolution operation for the device is without vibration isolation and with a thermal drift of less than 1 angstrom per hour.

6 Claims, 1 Drawing Sheet

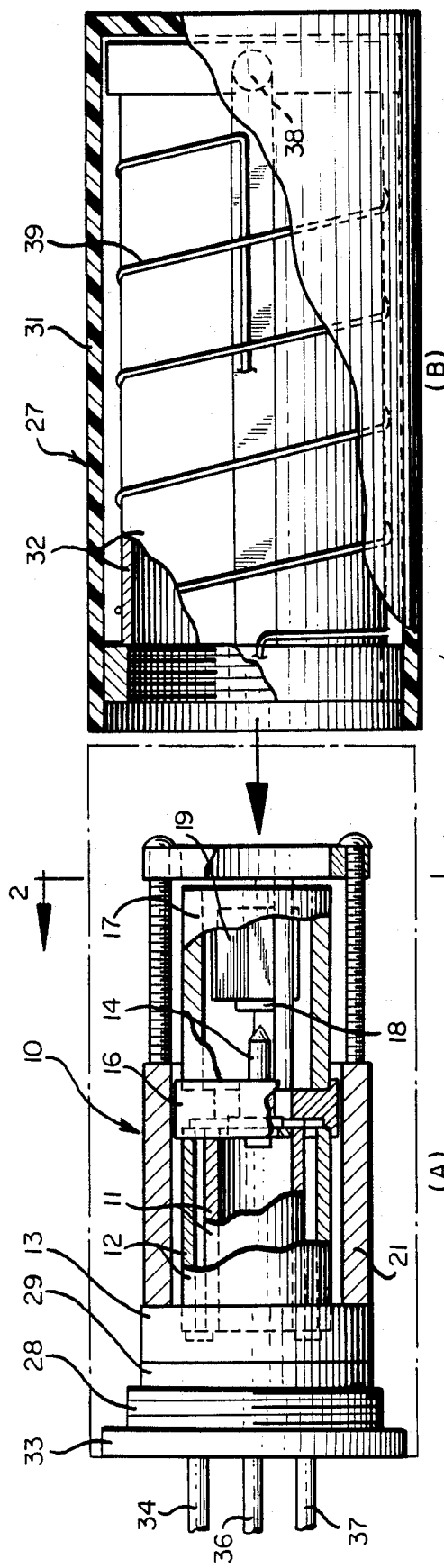
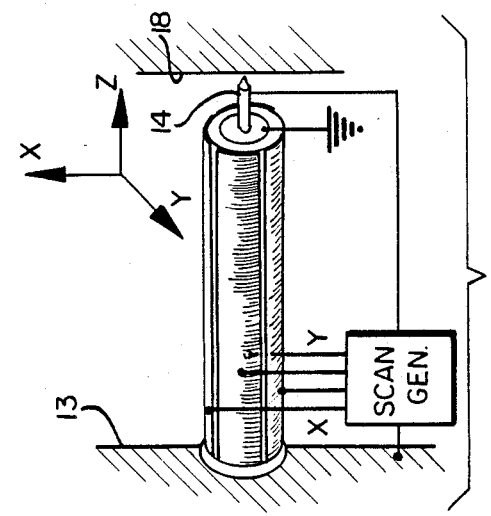
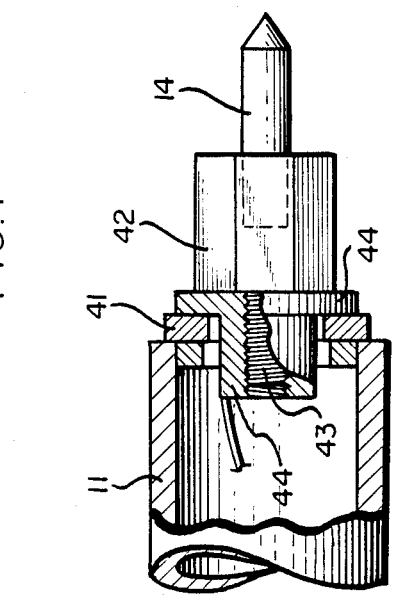
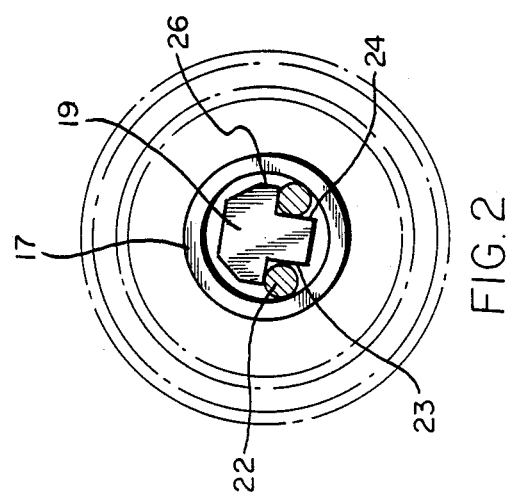

VARIABLE TEMPERATURE SCANNING TUNNELING MICROSCOPE

This invention relates to a scanning tunneling microscope (STM) which is thermally compensated for use at various temperatures and is also substantially insensitive to vibration and shock.

BACKGROUND

The development of atomic resolution scannng tunneling microscopy (STM) and spectroscopy (STS) by Binnig and Rohrer [(G. Binnig, H. Rohrer, Ch. Gerber, and E. Weibel, *Appl. Phys. Lett.*, 40, 178 (1982); *Phys. Rev. Lett.*, 49 57 (1982); and G. Binnig and H. Rohrer, *IBM J. Res. Dev.*, 30 355 (1986)] has opened a new era of surface science. The first STMs were based on the original IBM Zurich tripod design in which three orthogonal piezoelectric rods support and scan the tunneling probe, while sample translation is accomplished by means of an electrostatic "louse". The known systems of vibration isolation are of two primary types, i.e., two levels of spring suspension with associated eddy current damping, [(G. Binnig and H. Rohre, *Helv. Phys. Acta.*, 55, 726 (1982)] or the stacked plate arrangement with Viton spacers and springs separating a half-dozen or so metal plates. [Ch. Gerber, G. Binnig, H. Fuchs, O. Marti, and H. Rohrer, *Rev. Sci.*, 181, 92 (1987)]. More recently, the piezoelectrically driven "louse" has given way to the micrometer driven differential spring [B. Drake, R. Sonnenfeld, J. Schneir, and P. K. Hansma, *Surf. Sci.*, 181, 92 (1987)] and stepper motor gear reduction [Sang-il Park and C. F. Quate, *Rev. Sci. Instrum.*, 58, 2011 (1987)] approaches for coarse sample positioning. These techniques are more reliable and the differential spring assembly is easily incorporated into the overall STM design and works well at low temperatures. [A. P. Fein, J. R. Kirtley, and R. M. Feenstra, *Rev. Sci. Instrum.*, 58, 1806 (1987)].

A major problem with tripod scanners is thermal drift, with millikelvin temperature stability required for low drift imaging. [Sang-il Park and C. F. Quate, *Appl. Phys. Lett.*, 48, 112 (1986)]. This situation has been helped by alternate designs such as the thermally compensated matrix STM of van de Walle et al., [G. F. A. van de Walle, J. W. Geritsen, H. van Kempen, and P. Wyder, *Rev. Sci. Instrum.*, 56, 1573 (1985)] and the bimorph driven metal tripod design of Jericho et al. [B. L. Blackford, D. C. Dahn, and M. H. Jericho, *Rev. Sci. Instrum.*, 58, 1343 (1987)]. The thermally compensated matrix design uses small cubes of piezoelectric material arranged such that lateral and z-direction thermal drift cancel out. Although this design has relatively low thermal drift, it is not low enough for variable temperature work, and the design is complex and difficult to build.

A significant step towards simplifying STM design was the development of the tube scanner STM by Binnig and Smith. [G. Binnig and D. P. E. Smith, *Rev. Sci. Instrum.*, 57, 1688 (1986)]. In this design, a single piezoelectric tube with its outer electrode divided into four equal quadrants, parallel to the tube axis, provides lateral scanning motion by tube bending when voltages are applied to two adjacent outside quadrants, and z-displacement when voltage is applied to the common inner electrode. The tunneling probe is affixed to on of the grounded outer quadrants. Because of its simplicity, small size, and rigidity (with associted high resonance frequencies), the tube scanner has replaced the scanning sections of many older STM designs. Due to the tube's symmetry, a coaxially located tunneling probe would not undergo lateral thermal drift for uniform temperature changes. However, the elimination of thermal drift along the z-direction would require some sort of compensation. An effective compensation scheme is to affix the sample holder to a second, concentric piezoelectric tube which is the same length as the scanning tube. This would be the tube scanner analog of the thermally compensated matrix design of van de Walle et al. [G. F. A. van de Walle, J. W. Gerritsen, H. van Kempen, and P. Wyder, *Rev. Sci. Instrum.*, 56, 1573 (1985)].

Although it is reasonably straightforward to thermally compensate the scanning element(s) in an STM, there can still be considerable thermal drift and vibration sensitivity arising from the sample holder and its associated coarse positioning system. Most STM coarse positioning systems incorporate mechanical elements such as springs, levers, gears, micrometers, and stepper motors. These are coupled directly to the sample holder yet they are typically $10^8$ times larger than the tunneling gap width. Consequently, thermal drift and mechanical vibration of these elements directly modulates the tunneling gap.

An interesting design, which eliminates these components is the so called "Johnny Walker" STM [K. Besocke, *Surf. Sci.*, 181, 145 (1987)] in which a tube scanner is located symmetrically at the center of an arrangement of several additional tubes. This STM can be operated inverted with a sample being placed directly on the outer legs or non-inverted, in which the STM "walks" over a surface. Walking motion is accomplished by slowly bending and then rapidly straightening the outer legs, resulting in inertial translation of the entire STM. Inertial translation of a mass using a piezoelectric transducer configuration has been demonstrated by Pohl. [D. W. Pohl, *Surf. Sci.*, 181, 174 (1987); and *Rev. Sci. Instrum.*, 58, 54 (1987)]. Coarse positioning with the Johnny Walker STM is a problem requiring the sample be placed on an incline, and its overall size results in the need for vibration isolation and makes variable temperature operation difficult.

SUMMARY OF THE INVENTION

In accordance with the invention, there is provided an improved scanning tunneling microscope which is thermally compensated and substantially insensitive to vibration. The microscope comprises a pair of concentric piezoelectric tubes of the same length and composition. A tunneling probe is attached to an end of the inner tube, which is divided into equal lateral quadrants for providing lateral scanning motion. Attache to the adjacent end of the outer piezoelectric tube is an annular collar which connects to a sample holder tube. The dimensions and thermal expansion coefficient of the annular collar are selected to compensate for thermal variations in the length of the tunneling probe. The sample holder rests on two spaced quartz rods within the holder tube, and can be adjusted to bring the sample into tunneling range by inertial movement of the sample.

BRIEF DESCRIPTION OF THE DRAWINGS

In the accompanying drawings:

FIG. 1 is an exploded side view in partial section, of the two subassemblies A and B which make up the present invention;

FIG. 2 is a cross section along the line 2—2 of FIG. 1A;

FIG. 3 is a detail view of the probe assembly of FIG. 1A; and

FIG. 4 is a detail view of the inner piezoelectric tube of FIG. 1A.

DETAILED DESCRIPTION

Shown in FIG. 1 is a representation of a tunneling microscope in accordance with the invention which is compact, rigid, and fully thermally compensated. FIG. 1A is the microscope per se, while FIG. 1B shows a temperature control shroud which can be used for thermal isolation. Microscope 10 utilizes two concentric piezoelectric tubes 11 and 12 which are indium soldered into a common base 13. Inner tube 11, (typically 1.27 cm long×0.635 cm O.D.) supports and scans tunneling probe 14 while outer tube 12 (1.27 cm long ×0.953 cm I.D.) supports an annular collar 16 which holds a quartz sample holder tube 17. Inner scanning piezoelectric tube 11 is based on the design of Binnig and Smith. G. Binnig and D. P. E. Smith, *Rev. Sci. Insrum.*, 57, 1688 (1986). In the design (see FIG. 4) used herein, however, tunneling probe 14 is mounted along the central axis of tube 11 rather than on its edge. The advantage of this is that the radial thermal expansion o contraction of the scanning tube is symmetric about the tube axis, and thus does not result in lateral displacement (in the x-y plane) of the tunneling probe. This alone, however, does not compensate for temperature induced length changes of the scanning tube (in the z-direction). For this purpose, outer piezoelectric tube 12 is the same length and made from the same material as inner tube 11. Thus, quartz sample holder tube 17 which is attached through collar 16 to outer tube 12 moves in concert with inner scanning tube (11) length changes in response to temperature variations, resulting in zero net change of the distance from probe 14 to sample 18 attached to sample holder 19. Collar 16 connecting outer tube 12 to quartz sample holder tube 17 is chosen with respect to its length and thermal expansion coefficient such that its thermally induced length changes match that of the tunneling probe. Collar 16 is suitably made of beryllium copper and has a length which is shorter (becuse of higher thermal expansion coefficient) than the length of probe 14, which is suitably made of tungsten. Materials other than beryllium-copper and tungsten can be used for making the collar and the probe, respectively, as will be apparent to those skilled in the art, provided only that the relative lengths are appropriately adjusted. Since quartz (commercially available fused silica) has the lowest thermal expansion coefficient over a wide temperature range, quartz sample holder tube 17 and sample mounting block or holder 19 introduce negligible thermal drift. An OFHC (oxygen-free high purity copper) shroud 21 encloses outer piezoelectric tube 12 in order to minimize temperature gradients which might defeat the desired thermal compensation.

A key feature of the present invention is the fact that outer piezoelectric tube 12 is used not only to provide thermal compensation, but also to provide a means of inertially translating sample 18 under study toward or away from tunneling probe 14. For example, to translate sample 18 towards probe 14, a voltage ramp (sawtooth) is applied to outer piezoelectric tube 12, causing it to contract. At the end of the ramp, the voltage is rapidly returned to its initial value, causing tube 12 to rapidly expand back to its initial position. Due to inertia, sample mounting block 19 which rests and slides on rails 22 in quartz sample holder tube 17, cannot follow the rapid motion of the rails. Thus, when the outer tube returns to its initial position, sample holder 19 block has been translated towards tunneling probe 14 by one "step". By adjusting the amplitude and timing of the ramp signal, step sizes ranging from 1 micron down to about 5 angstroms are readily achieved. This stepping process can be repeated very rapidly (up to several kHz) resulting in very fast translation (up to 1 mm/sec) of sample 18 toward probe 14. By reversing the ramp symmetry, sample 18 can be readily stepped away from tunneling probe 14. In a test microscope, it was found that the sample can be translated into tunneling range at a rate visible to the naked eye without "crashing" into tunneling probe 14. For this coarse translation, voltage ramps of $+/-150$ volts peak-to-peak are typically used. Once in tuneling range, the dc voltage level can be adjusted to fine tune the sample-to-probe distance. In practice, however, several small inertial steps (typically 5 angstroms, with $+/-30$ volt ramps) are taken first, while in tunneling range, in order to zero the feedback voltage. This eliminates the need for large dc voltages being applied to piezoelectric tubes 11 and 12, and hence, virtually eliminates the slow drift associated with piezoelectric creep. As a result of this design, no mechanical positioning devices such as micrometers or stepper motors with their associated reduction gears, levers or springs are necessary. Elimination of these components greatly reduces the complexity and size of the design while improving its performance.

For sample registry, quartz sample holder block 19 has two notches 23 and 24 which fit over quartz rails 22 in sample holder tube 17. With the STM in its horizontal operating position, one of these quartz rails is higher than the other such that gravity forces the sample holder block to slide along the lower rail. This provides precise repositioning of the sample holder block even if it is removed from the STM and subsequently replaced.

Electrical contact to sample 18 can be achieved by sputtering or depositing chromium or other metals onto the quartz. In one embodiment, chromium is sputtered onto the quartz sample holder rails 22, as well as notches 23, 24, and sides 26 of sample holder block 19. This provides two electrical contacts for a sample mounted on the face of the block; one for the tunneling current return path and one for auxilary sample biasing. Once sample 18 has been mounted on sample holder block 19, electrical contacts with the STM system are automatically made by placing the block on the rails. This expedites sample turn around time and greatly simplifies operation in restricted environments such as ultrahigh vacuum.

For variable temperature operation, a temperature control assembly 27 (FIG. 1B) is placed over microscope 10 and screwed onto a threaded base 28 (FIG. 1A), separated from base 13 by a teflon washer 29. Thermal isolation is accomplished by fitting a teflon sleeve 31 over an-odized aluminum shroud 32 which then fits over a teflon plug 33 adjacent threaded base 28 when shroud 32 is screwed in place. Shroud 32 is provided with a silicon diode temperature sensor 38 and wound with a chromel heater 39 for use with a suitable temperature controller (not shown). Electrical feedthroughs 34, 36, and 37 through base 33 are low heat leak stainless steel coaxial cable. While the individual electrical connections to the components of the STM of the invention are not shown, those skilled in the art will appreciate that such are necessary, and will also know how to make the connections. Similarly, it will be appreciated that an appropriate control and power circuit must be supplied for use with the invention.

The STM of the invention provides atomic resolution without vibration isolation, a result not previously achieved. By eliminating all of the mechanical positioning mechanisms used in prior designs, the STM plus sample holder block 19 move in unison in response to external vibrations until the static friction between sample holder block 19 and quartz rails 22 is overcome. The forces due to normal building and sound vibrations are insufficient to overcome this static friction.

The invention provides very good electrical shielding for the sensitive tunneling circuit. Collar 16 which connects sample holder tube 17 to outer piezoelectric tube 12 also covers the annular gap between the tubes where the scanning and translating voltages are applied. In addition, temperature control shroud 32 is maintained at ground potential to provide a shielded enclosure for the entire STM. Since vibration isolation is not required, all of the electrical connections are routed via coaxial cables 34, 36, 37 whose shields are soldered into base 13 of the STM. Other designs using flexible long wires to prevent vibration coupling, suffer in terms of poor electrical shielding.

It has also been found that teflon insulated coaxial cable must be avoided for the sensitive probe circuit, since ambient vibrations generate considerable triboelectric charges. Further electrical shielding is obtained in the design of the invention by maintaining the inside of scanning tube 11 at ground potential, since it is in close proximity to the sensitive tunneling circuit. As shown in FIG. 3, tunneling probe 14 is isolated from ground by means of alumina washer 41. This allows tunneling probe 14 to be biased at any desired potential while minimizing spurious pickup which could occur if the z-axis control voltage were applied to the inner contact of scanning tube 11 as it is in conventional tube scanner STMs. Instead, the z-axis control voltage is electronically summed to the x- and y-axis control voltages which are then applied to the four outer quadrant contacts of scanning tube 11. Since tunneling probe 14 is mounted coaxially, all four quadrants must be used, otherwise the x- and y-axis control voltages would introduce an erroneous z-axis displacement. In other words, if one side of tube 11 is shortened to bend it in the +x direction, tunneling probe 14 would be pulled away from sample 18 by one-half of the tube shortening distance. To prevent this, the opposite side of the tube must be extended by the same amount, thus requiring the same magnitude but opposite polarity voltage. Consequently, four high voltage amplifiers (not shown) are required to provide $x+z$, $-x+z$, $y+z$ and $-y+z$ control voltages for the scanning tube outer quadrants. Existing tube scanner STMs utilize only three high voltage amplifiers since the tunneling probe is mounted to one of two adjacent quadrants which are at ground potential, and hence, do not expand or contract. The disadvantages of this are the loss of coaxial thermal compensation and the fact that for the same lateral displacement, twice the voltage used in the present invention must be applied. Thus, for the same lateral displacement the invention exhibits less piezoelectric hysteresis and creep while for the same high voltage limit it provides four times the scan area of conventional tube scanners. An additional advantage of this new operating scheme is that imperfections in the piezoeletric tube and its machining can be electronically balanced out.

Tunneling probe replacement is accomplished very easily. Tunneling probe 14 is soldered into a beryllium copper tip holder 42 (FIG. 3) which is shaped for use with a conventional hexagonal wrench and has a threaded tail 43, which is screwed into an internally threaded adaptor 44 on scanning tube 11. For nonsolderable metals such as tungsten, the base of tunneling probe 14 can be electroplated with nickel to enable soft soldering into the tip holder. With this arrangement, minimal manipulation requirements are necessary for operation in restricted environments such as ultra-high vacuum. The foregoing detailed description has been given for clearness of understanding only, and no unnecessary limitations should be understood therefrom as modifications will be obvious to those skilled in the art.

What is claimed is:

1. A scanning, tunneling microscope comprising:
   a base;
   an inner and an outer piezoelectric tube concentrically connected to said base, said tubes having substantially the same length and the same composition;
   a tunneling probe having a tip, said probe being coaxially connected to an end of said inner piezoelectric tube opposite said base;
   a temperature compensating annular collar coaxially connected to an end of said outer piezoelectric tube opposite said base, said collar having a length and composition to compensate for thermal changes in the length of said probe;
   a sample holder tube axially connected to said collar;
   a pair of spaced rails extending longitudinally within said holder tube and attached thereto;
   a holder for holding a sample to be examined, said holder resting on and movable along the length of said rails;
   conductor means for applying selected voltages to said outer piezoelectric tube to cause inertial movement of said sample along said rails to a distance within tunneling range from said tip of said probe; and
   conductor means for applying selected voltages to said inner piezoelectric tube to cause said probe to scan a portion of a surface of said sample.

2. A tunneling microscope in accordance with claim 1 wherein said sample holder is provided with spaced notches adapted to engage said spaced rails.

3. A tunneling microscope in accordance with claim 2 wherein one of said rails is at a greater elevation than the other.

4. A tunneling microscope in accordance with claim 2 wherein said sample holder tube, said sample holder, and said rails are all made of fused silica.

5. A tunneling microscope in accordance with claim 1 wherein said base and said annular collar are made of beryllium-copper.

6. A tunneling microscope in accordance with claim 1 further including a temperature control shroud comprising a removable thermally insulated hollow cylinder adapted to envelop said microscope, said cylinder being provided with temperature control means.

* * * * *

UNITED STATES PATENT AND TRADEMARK OFFICE
CERTIFICATE OF CORRECTION

PATENT NO. : 4,841,148
DATED : June 20, 1989
INVENTOR(S) : Joseph W. Lyding

It is certified that error appears in the above-identified patent and that said Letters Patent is hereby corrected as shown below:

Col., 1, line 66, "on" should be --one--.

Col., 2, line 53, "Attache" should be --Attached--.

Col. 3, line 26, "o" should be --or--.

Col. 4, line 59, "an-odized" should be --anodized--.

Signed and Sealed this

Twenty-second Day of May, 1990

Attest:

HARRY F. MANBECK, JR.

*Attesting Officer*  *Commissioner of Patents and Trademarks*